Oct. 13, 1925.
G. JACOBS
1,557,291
SIGNAL
Filed March 29, 1921
2 Sheets-Sheet 1
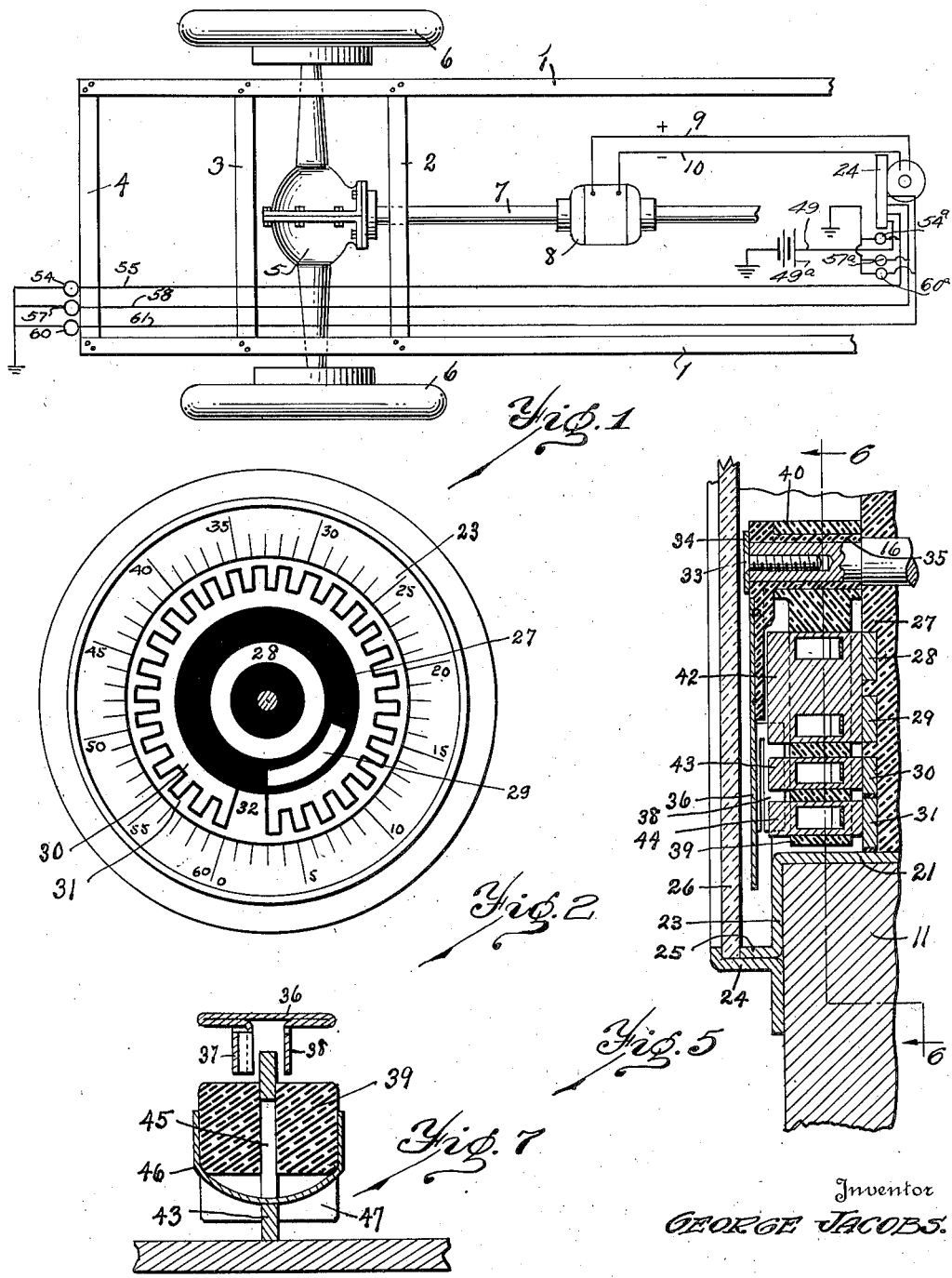

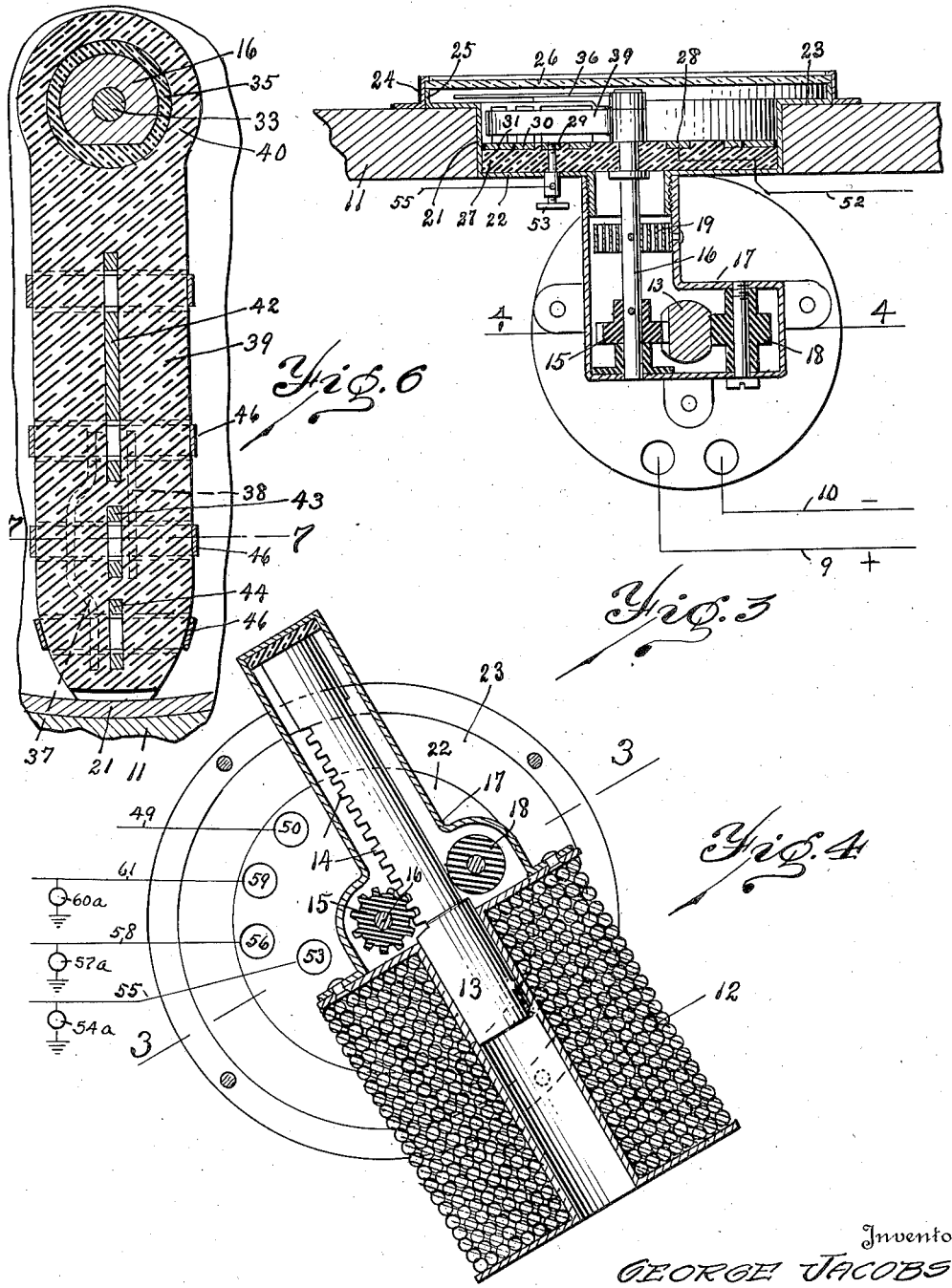

Patented Oct. 13, 1925.

1,557,291

UNITED STATES PATENT OFFICE.

GEORGE JACOBS, OF DETROIT, MICHIGAN.

SIGNAL.

Application filed March 29, 1921. Serial No. 456,718.

*To all whom it may concern:*

Be it known that I, GEORGE JACOBS, a citizen of the United States, and residing at Detroit, in the county of Wayne and State of Michigan, have invented a new and Improved Signal, of which the following is a specification.

This invention relates to means including signal lamps adapted to be mounted on a motor vehicle, which shall be controlled by the speed of the vehicle to signal changes or conditions of speed to those behind, and its object is to provide a signaling device of this character which will be simple in construction and not liable to get out of order, and which will embody a plurality of signal lamps and means to control the current thereto so that one of the lamps will shine steadily while the vehicle is increasing speed and another lamp will shine intermittently while the vehicle is running at decreasing speeds.

This invention consists in a signal device for motor vehicles which embodies a plurality of lights, one of which shines steadily while the vehicle's speed is between certain predetermined limits; and a second which shines steadily while the vehicle increases its speed, and mechanism positioned according to the speed of the vehicle for controlling the current to such lights.

It further consists in a signal device of this character, of a third lamp and a circuit therefor so controlled that it will alternately shine and extinguish when the speed of the vehicle decreases.

It also consists in the details of construction illustrated in the accompanying drawing and particularly pointed out in the claims.

In the drawings, Fig. 1 is a conventional plan of the rear portion of the running gear of a motor vehicle. Fig. 2 is a plan of a speed indicator dial showing contact plates mounted therein. Fig. 3 is a section of a speed indicator and control switch on the line 3—3 of Fig. 4. Fig. 4 is a section of the same on the line 4—4 of Fig. 3. Fig. 5 is a radial section of the indicator and switch through the contact plates. Fig. 6 is a section on the line 6—6 of Fig. 5. Fig. 7 is a section on the line 7—7 of Fig. 6.

Similar reference characters refer to like parts throughout the several views.

In Fig. 1 I have indicated conventionally the side bars 1 and cross bars 2, 3 and 4 of a chassis, a rear axle casing 5, wheels 6 and a propeller shaft 7. On the propeller shaft is an electric generator 8 whose output of E. M. F. is proportionate to the speed of the vehicle and wires 9 and 10 connect to the winding 12 of a solenoid which is preferably mounted on the instrument board 11 of the vehicle. The core 13 of this solenoid is formed with rack teeth 14 to engage the pinion 15 on the shaft 16 of the speed indicator and control switch. A casing 17 encloses the core and parts in contact therewith including the guide roller 18. The movement of the core is resisted by a spiral spring 19, Fig. 3, and its movement is in proportion to the E. M. F. of the generator 8 and therefore to the speed of the vehicle.

A cylindrical casing 21 has a bottom 22 connected to the casing 17 and has a radial flange 23 which is graduated as shown in Fig. 2. A ring 24 and cylindrical flange 25 on the casing 21 hold the glass disk 26 in position. On the bottom 22 is secured a disk 27 of insulating material in which are embedded a contact ring 28 connecting to a current source, a short segment 29, and two outer rings 30 and 31, formed with interfitting fingers. The ring 31 has an inner extension 32 which separates the ends of the inner ring 30. These two rings are electrically insulated from each other and from the casing 21.

Secured to the shaft 16 in any desired manner, a screw 33 and washer 34 being shown, is a sleeve 35 of insulating material to which a pointer 36 is attached. This pointer is preferably of sheet metal and has two downwardly extending flanges 37 and 38 which are indicated in dotted lines in Fig. 6.

Loosely mounted on the sleeve 35 is a contact-blade carrier 39 having a hub 40 and in which the contact blades 42, 43 and 44 are loosely mounted. Each blade has at least one slot 45 (Fig. 7) in which a spring 46 is mounted to press the blade against the disk 27 and the contact rings embedded therein, the contact-blade carrier having transverse notches 47 to receive these springs. The length and position of the blades 42, 43 and 44 are such that the blade 42 always engages the ring 28 which is always connected to the battery and it also extends to the contact segment 29 until the carrier 39 is turned to carry this blade beyond this segment. The flange 38 is straight and contacts with blades 42 and 43 while the pointer is advancing because of increasing speed and the flange 37 is arched so that it contacts with the blades 42 and 44 while the pointer is returning because of decreasing speed of the vehicle.

While the wires 9 and 10 carry current from the generator 8, the circuits controlled by the rings 28, 29, 30 and 31 and the blades contacting therewith are preferably connected to a current source 49ª, Fig. 1, by a wire 49, indicated in Fig. 4 to connect to a post 50, and a wire 52 connects this post to the ring 28, as indicated in Fig. 3. The post 53 connects to the segment 29 and to a lamp 54 by means of a wire 55, the post 56 connects to the ring 30 and also connects to the lamp 57 by the wire 58, and the post 59 connects to the ring 31 and also to the lamp 60 by the wire 61. I prefer the lamp 54 to be white, the lamp 57 to be green and the lamp 60 to be red. All these lamps are preferably of the so-called single contact type, and small tell-tale lamps 54ª, 57ª and 60ª may be in parallel therewith on the instrument board as indicated in Fig. 4. The operation of this device is as follows.

The spring 19 will normally hold the core 13 in the position shown in Fig. 4 and the pointer 36 at zero on the scale 23. As the vehicle begins to travel and the winding 12 becomes energized, the pointer swings around to the left and the flange 38 immediately engages both the blades 42 and 43, moving them over onto the segment 29 and ring 30, causing both a white lamp 54 and a green lamp 57 to shine at the rear end of the vehicle. The blade 44 in the meantime is being pulled along by the insulated carrier 39 and receives no current. This will indicate that the vehicle is either increasing or holding its speed at less than the predetermined limit, say fifteen miles an hour. As soon as this speed is exceeded the blade 42 leaves the contact segment 29 and the white lamp 54 is extinguished; the green lamp, however, shines until the speed drops.

When the vehicle begins to slow up, the flange 38 on the pointer swings away from the blades 42 and 43 and the flange 37 moves into engagement with the blades 42 and 44, and as this blade 44 slides over the interfitting points of the teeth on the rings 30 and 31, current will pass to the green lamp 57 and red lamp 60 alternately, thus signaling to those following that the vehicle is slowing down. As the flange 37 is arched at the blade 43, no current passes therefrom to the contact ring 30. When the vehicle has slacked down to the predetermined speed above mentioned, the white lamp 54 will again receive current and continue to shine until the speed falls to say four miles per hour, when this too extinguishes. The final movement of the pointer and its flange 37 carries the blade 44 over the extension 32 of the ring 31 so that current will then flow over the wire 49, post 50, wire 52, battery ring 28, blade 42, flange 37, blade 44, ring 31, post 59, and wire 61 to the lamp 60, which will shine until the vehicle is again set in motion.

We have then a signal system which displays a white lamp while the speed of the vehicle is between certain predetermined limits, a green lamp which shines while the vehicle is increasing speed, and a red light which shines while the vehicle is at rest or moving very slowly, the red and green light alternating while the vehicle is slowing down and until it reaches a low speed limit.

The details of construction and proportions of the parts may all be changed by those skilled in the art without departing from the spirit of my invention as set forth in the following claims.

I claim:—

1. A signaling device for vehicles comprising a plurality of electric lamps, a pointer and means actuated by the vehicle to position the pointer according to the speed of the vehicle, a rotatable member adapted to be moved by said pointer in either direction, contact blades mounted in the rotatable member and insulated from each other, fixed contacts adapted to be engaged by said blades, and circuits between the fixed contacts and a current source and said lamps said pointer being adapted to engage and electrically connect predetermined blades when moving in one direction and to engage and connect other blades when moving in the opposite direction.

2. A signaling device for vehicles comprising a plurality of electric lamps, a pointer and means actuated by the vehicle to position the pointer according to the speed of the vehicle, a rotatable member adapted to be moved by said pointer in either direction, contact blades mounted in the rotatable member and insulated from each other, fixed contacts adapted to be engaged by said blades, and circuits between the fixed contacts and a current source and said lamps said pointer being adapted to engage and electrically connect predetermined blades when moving in one direction and to engage and connect other blades when moving in the opposite direction, the fixed contact connected to the current source being a complete ring.

3. A signaling device for vehicles comprising a plurality of electric lamps, a pointer and means actuated by the vehicle to position the pointer according to the speed of the vehicle, a rotatable member adapted to be moved by said pointer in either direction, contact blades mounted in the rotatable member and insulated from each other, fixed contacts adapted to be engaged by said blades, and circuits between the fixed contacts and a current source and said lamps said pointer being adapted to engage and electrically connect predetermined blades when moving in one direction and to engage and connect other blades when moving in the opposite direction, the fixed contact connected to the current source being a complete ring and one of the other fixed contacts being a segment of a ring.

4. A signaling device for vehicles comprising a plurality of electric lamps, a pointer and means actuated by the vehicle to position the pointer according to the speed of the vehicle, a rotatable member adapted to be moved by said pointer in either direction, contact blades mounted in the rotatable member and insulated from each other, fixed contacts adapted to be engaged by said blades, and circuits between the fixed contacts and a current source and said lamps said pointer being adapted to engage and electrically connect predetermined blades when moving in one direction and to engage and connect other blades when moving in the opposite direction, the fixed contact connected to the current source being a complete ring, two other contacts being concentric rings having interfitting fingers insulated from each other and adapted to be engaged by the same contact blade.

5. A signaling device for vehicles comprising a plurality of electric lamps, a pointer and means actuated by the vehicle to position the pointer according to the speed of the vehicle, a rotatable member adapted to be moved by said pointer in either direction, contact blades mounted in the rotatable member and insulated from each other, fixed contacts adapted to be engaged by said blades, circuits between the fixed contacts and a current source and said lamps said pointer being adapted to engage and electrically connect predetermined blades when moving in one direction and to engage and connect other blades when moving in the opposite direction, the pointer operating means embodying a solenoid, an electric generator connected to a driving member of the vehicle, and circuits connecting the generator and solenoid.

6. A signaling device for vehicles comprising a plurality of electric lamps, a movable indicator and means actuated by the vehicle to position the pointer according to the speed of the vehicle, a series of movable contacts adapted to be shifted by said indicator, a series of stationary contacts adapted to be engaged by the movable contacts means on said indicator to electrically connect a plurality of said movable contacts when the indicator is moving in one direction and other means on said indicator to electrically connect another plurality of said movable contacts when the indicator is moving in the opposite direction, and circuits between one of the stationary contacts and a current source and between the other stationary contacts and said lamps.

7. A signaling device for vehicles comprising a plurality of electric lamp, a movable indicator and means actuated by the vehicle to position the pointer according to the speed of the vehicle, a series of movable contacts adapted to be shifted by said indicator, a series of stationary contacts adapted to be connected by the movable contacts, and circuits between one of the stationary contacts and a current source and between the other stationary contacts and said lamps, said indicator having flanges of conducting metal adapted to engage opposite sides of said movable contacts.

8. A signaling device for vehicles comprising a plurality of electric lamps, a movable indicator and means actuated by the vehicle to position the pointer according to the speed of the vehicle, a series of movable contacts adapted to be shifted by said indicator, a series of stationary contacts adapted to be connected by the movable contacts, and circuits between one of the stationary contacts and a current source and between the other stationary contacts and said lamps, said movable contacts comprising alined blades, a rotatable arm of non-conducting material in which said contact blades are mounted and springs secured to said arm to press said movable contacts against the stationary contacts.

9. A signaling device for vehicles comprising a plurality of electric lamps, a movable indicator and means actuated by the vehicle to position the pointer according to the speed of the vehicle, a series of movable contacts adapted to be shifted by said indicator, a series of stationary contacts adapted to be connected by the movable contacts, and circuits between one of the stationary contacts and a current source and between the other stationary contacts and said lamps, said movable contacts comprising alined blades, a rotatable arm of non-conducting material in which said contact blades are mounted and springs secured to said arm to press said movable contacts against the stationary contacts, the fixed contact connected to the current source being a complete ring.

10. A signaling device for vehicles comprising a plurality of electric lamps, a movable indicator and means actuated by the vehicle to position the pointer according to the speed of the vehicle, a series of movable contacts adapted to be shifted by said indicator, a series of stationary contacts adapted to be connected by the movable contacts, and circuits between one of the stationary contacts and a current source and between the other stationary contacts and said lamps, said movable contacts comprising alined blades, a rotatable arm of non-conducting material in which said contact blades are mounted and springs secured to said arm to press said movable contacts against the stationary contacts, the fixed contact connected to the current source being a complete ring, two other contacts being concentric rings having interfitting fingers insulated from each other and adapted to be engaged by the same contact blade so as to cause alternating flashing of two of the lamps.

11. A signaling device for vehicles comprising a plurality of electric lamps, a movable indicator and means actuated by the vehicle to position the pointer according to the speed of the vehicle, a series of movable contacts adapted to be shifted by said indicator, a series of stationary contacts adapted to be connected by the movable contacts, and circuits between one of the stationary contacts and a current source and between the other stationary contacts and said lamps, said movable contacts comprising alined blades, a rotatable arm of non-conducting material in which said contact blades are mounted and springs secured to said arm to press said movable contacts against the stationary contacts, the fixed contact connected to the current source being a complete ring, two other contacts being concentric rings having interfitting fingers insulated from each other and adapted to be engaged by the same contact blade so as to cause alternating flashing of two of the lamps, and one of the rings having an extension to be engaged by one of the contact blades so that the lamp connected to said ring will receive current when the vehicle is at rest.

12. A signaling device for vehicles comprising a plurality of electric lamps, a movable indicator and means actuated by the vehicle to position the pointer according to the speed of the vehicle, a series of movable contacts adapted to be shifted by said indicator, a series of stationary contacts adapted to be connected by the movable contacts, and circuits between one of the stationary contacts and a current source and between the other stationary contacts and said lamps, said indicator having conducting flanges adapted to engage different groupings of movable contacts as the indicator moves one way or the other as the speed of the vehicle increases or decreases.

GEORGE JACOBS.